United States Patent [19]

Asplund et al.

[11] Patent Number: 5,801,367
[45] Date of Patent: Sep. 1, 1998

[54] VOYAGE REGISTRATION SYSTEM

[75] Inventors: Johan Asplund, Hornsgatan 61, S-118 49 Stockholm; Nils-Olof Lundholm, Kalix, both of Sweden

[73] Assignee: Johan Asplund, Stockholm, Sweden

[21] Appl. No.: 656,222

[22] PCT Filed: Dec. 8, 1994

[86] PCT No.: PCT/SE94/01180

§ 371 Date: Jul. 8, 1996

§ 102(e) Date: Jul. 8, 1996

[87] PCT Pub. No.: WO95/16245

PCT Pub. Date: Jun. 15, 1995

[30] Foreign Application Priority Data

Dec. 8, 1993 [SE] Sweden ............... 9304087

[51] Int. Cl.⁶ .................. G06K 19/067; G07F 7/08
[52] U.S. Cl. .................................. 235/384; 235/492
[58] Field of Search ......................... 235/375, 382, 235/380, 492, 384

[56] References Cited

U.S. PATENT DOCUMENTS 5,180,901  1/1993  Hiramatsu ..................... 235/492

FOREIGN PATENT DOCUMENTS 2-206594  8/1990  Japan ........................... 235/384
2-206595  8/1990  Japan ........................... 235/384
WO 93/02430  2/1993  WIPO ........................... 235/492

Primary Examiner—F. L. Evans
Attorney, Agent, or Firm—Young & Thompson

[57] ABSTRACT

A travel registration arrangement including a travel pass unit for general communication, e.g. by train, by air, by sea, by bus. The unit (15) includes a processor, a write and erasable memory unit connected to the processor, a display window (2) and keys that can be manipulated by a traveller provided with the travel pass. The system includes a station (10) for issuing the travel pass unit. A traveller who wishes to obtain a travel pass is registered in the station together with a code number which is unique to the unit (15) and which is written into a fixed memory. Data relating to the traveller is written into the writable memory unit of the travel pass and, on the occasion of issue, possibly also data relating to the journey or route concerned. Data relating to the issued travel pass is stored in a data base (11), together with information relating to the journey or route concerned. A plurality of terminals (17–20) which include travel pass unit readers/writers are connected to the data base (11). Subsequent to inserting the travel pass unit, each terminal will scan the data written in its memory, check this data with data in the date base relating to the travel pass unit, and check that the data contained in the travel pass unit relating to journey or route coincides with the journey or route written in the data base. If no agreement is found, the data stored in the data base relating to the journey or the route is written into the memory of the travel pass unit.

6 Claims, 2 Drawing Sheets

VOYAGE REGISTRATION SYSTEM

FIELD OF THE INVENTION

The present invention relates to a travel registration system having a travel ticket unit.

BACKGROUND OF THE INVENTION

Developments within the travel industry have progressed more and more towards the use of a travel ticket or travel pass which includes information that can be read electronically, for instance cards equipped with microchips, so-called smart-cards. The problem with these is that the user is unable himself to read-off the status of the ticket easily. Moreover, the cards cannot be read if no serviceable card reader is available.

Smart-cards are relatively common in present times. They have many areas of use. One of these areas is their use as travel tickets, where a user has paid for the ticket and the sum involved has been stored in the memory of the processor. Each time the ticket is used, a sum corresponding to the price of the journey, or fare, is subtracted from the sum stored in the memory. The ticket can be used until the sum stored in the processor memory has been used up. Examples of this type of ticket are described in U.S. Pat. No. 5,122,643, U.S. Pat. No. 4,460,965, U.S. Pat. No. 4,303,904. U.S. Pat. No. 5,122,643 also describes a smart-card which includes a display window in which the remaining sum stored in the card is shown. On the other hand, the window does not show the use area of the ticket or pass, i.e. the journeys or routes that have been booked.

Thus, no earlier system is known in which the purpose of the travel pass can be read-off, which is a necessary prerequisite for the type of travel pass required when travelling by air, train, boat or bus over long distances, where a seat booking must be made in advance.

OBJECTS OF THE INVENTION

An object of the present invention is to provide a travel registration system with travel pass unit which will enable the status of the journey or route concerned to be indicated in a positive and acceptable manner Another object of the invention is to provide a travel registration system with travel pass unit which will enable the status of the journey or route concerned to be inserted into the travel registration system on an occasion other than the occasion of its insertion in the travel pass unit, this system being provided with an arrangement for automatically updating the travel pass unit, for instance on the occasion of the journey.

Still another object of the invention is to provide a travel registration system which includes a travel pass unit which is flexible and which can be read-off in different ways in different types of reading systems or at different places in accordance with local regulations.

Yet another object of the invention is to provide an intelligent travel pass unit which is cheap, durable and flexible.

Still another object of the invention is to provide a travel pass unit which is not dependent on the presence of special electronic pass reading equipment, although the pass unit can also be read by such equipment.

Another object of the invention is to provide a travel pass unit which will clearly identify the user as the owner of the unit without the card owner needing to key-in a code on the card keys.

These objects are fulfilled with a travel pass unit having the characteristic features of the present invention.

SUMMARY OF THE INVENTION

The inventive system includes a station for issuing travel pass units. A traveller wishing to obtain a travel pass is registered in the station together with a code number which is unique to the travel pass unit and which is written into a fixed memory. Data concerning the traveller is written into the writable memory unit of the travel pass and, on the issuing occasion, possibly also data concerning the journey or the route concerned. Data relating to the issued travel pass is stored in a data base together with information relating to the journey or route concerned. A plurality of terminals which include travel pass unit readers/writers are connected to the data base. After having inserted the travel pass unit into a respective terminal, the terminal reads the data that has been written into the memory of the pass unit, checks this data with a data relating to the travel pass unit in the data base, and checks that the data written into the unit relating to journey or route coincides with the journey or route written into the data base. If no agreement is found, the data stored in the data base relating to the journey or the route is written into the memory of the travel pass unit.

The invention also relates to a travel registration system which includes a travel pass unit that contains electronic information concerning the journeys stored in an electric memory and which is able to communicate with an external reader which is able to process information independently, without external connection, and communicate visually with the traveller in possession of the travel pass, and which can be used for visual access control when no pass reading equipment is available or when the reading equipment present is out of order.

BRIEF DESCRIPTION OF THE DRAWINGS

The invention will now be described in more detail with reference to the accompanying drawings, in which.

DETAILED DESCRIPTION OF THE INVENTION

Figure 1:
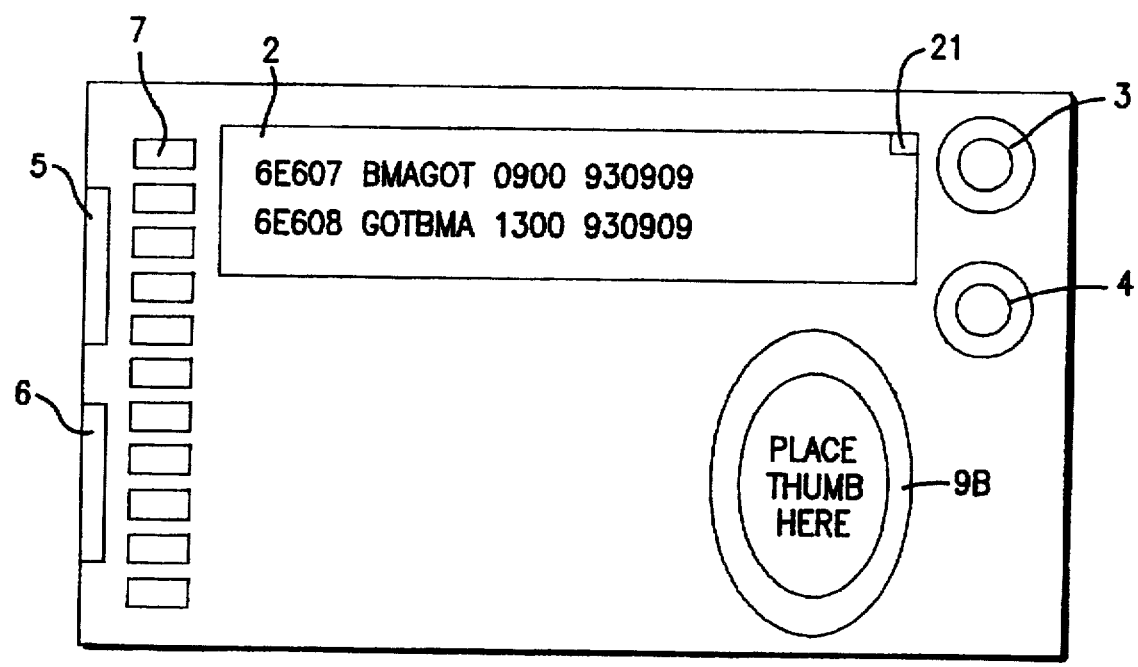
FIG. 1 shows the front side of a first embodiment of an inventive travel pass unit.
Figure 2:
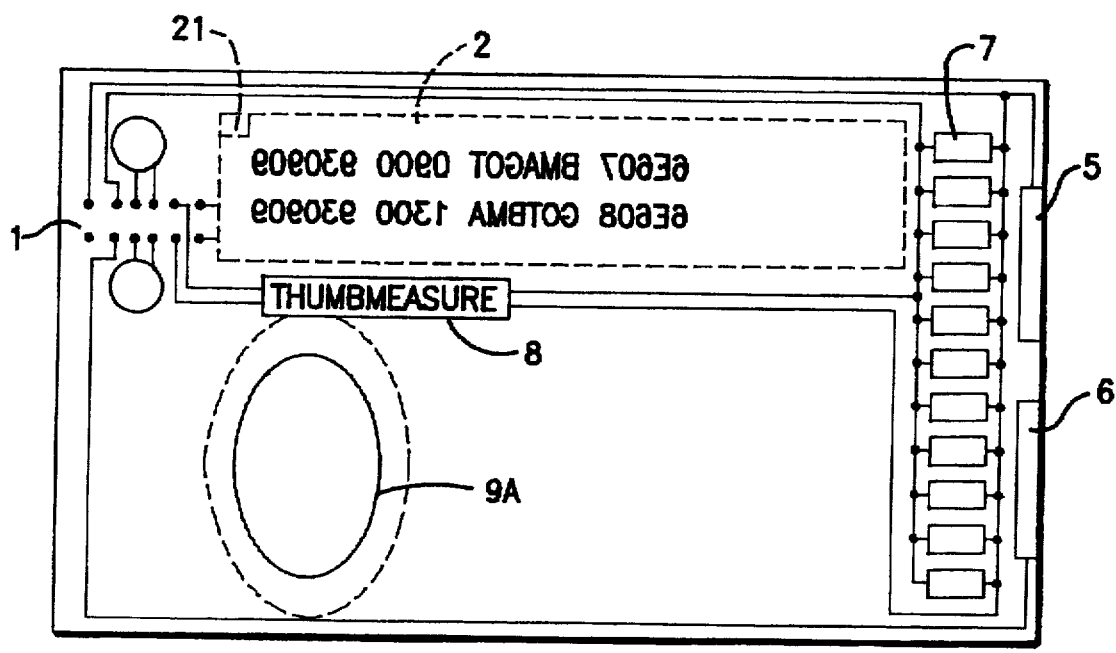
FIG. 2 shows the rear side of the unit shown in FIG. 1.

FIGS. 1 and 2 illustrate an embodiment of a travel pass unit wherein the reference numeral 1 identifies a base for a small processor, for instance in the form of a chip which includes a CPU-unit and an associated temporary memory (RAM or EEPROM), and a fixed memory (RON). It will be understood that CPU and memory may instead have the form of two chip-units.

The temporary memory is preferably a so-called flash memory and a suitable size of the memory for the intended area of use of the travel pass is 3–10 kbytes for instance. Stored in the fixed memory is a serial number which is individual to the card and which may not be changed. Although not shown on the illustrated card, the card may include an extra base so as to enable the memory to be extended. It shall only be possible to change the content of the temporary memory with regard to the traveller and travel data by external communication, i.e. not by the processor. The memory retains its data content for the whole of the period for which the travel pass is valid.

The processor is connected to a display window 2. As illustrated in FIGS. 1 and 2, this window is of the liquid crystal type (LCD) and includes at least two rows of text. An appropriate number of characters in each row to enable the correct amount of information to be shown is about 30. Naturally, the crystals may be given a pattern which will enable characters other than letters and numbers to be shown, for instance a registered picture of the card owner stored in the temporary memory.

The travel pass unit illustrated in FIGS. 1 and 2 includes two keys 3 and 4 which enable information stored in the memory to be rolled-in for both forward and rearward display, i.e. stepwise when fixed rows are used or continuously when the display window is able to show a picture. The memory of the processor cannot be re-written by pressing these keys.

The travel pass unit has two units 5 and 6 for writing information into and reading information from the memory of the processor externally. In the illustrated case, each of the units 5, 6 is comprised of a simple contact surface and the information is written-in and read out serially. The unit 5 is connected to an earth conductor, to which there is also connected an electric current supply pack or power pack 7 mounted on the card.

The processor may also be programmed to switch-off the window 2 after a predetermined period of time has lapsed, for instances three minutes after having switched-on the window, said window being switched-on immediately when one of the keys 3 or 4 is maneuvered.

The power pack 7 is suitably comprised of solar cells, although it may also conceivably be comprised of thin batteries, which may either be exchangeable or rechargeable type. The batteries may be charged when issuing the travel pass and recharged on each occasion that a new travel pass is issued on the same travel pass unit The external read/write unit may be provided with a battery sensor and battery charger. FIG. 2 illustrates several current supply units that are connected in parallel. Naturally, these units must be supplied with sufficient voltage to drive the processor and the display window, meaning that the units must be supplied with a voltage of at least 1.3 V. Consequently, when solar cells are used the calls will preferably have at least three segments. It can be mentioned that when EEPROM is used as the temporary memory, it may be necessary when writing-in information to apply a higher voltage than that which is available on the card. This does not present a problem, however, since the information is written into the memory in a known way directly from an external source with the higher voltage on the digital signal.

The card also includes a thumb measuring circuit 8 which is controlled by the processor and which provides additional security against unauthorized use of the card by a person other than the traveller. People have different sized thumbs and also different dielectric constants. This fact can be used to provide an indication that it is the card owner himself who presents the card. The Figure shows that this measurement can be effected capacitively, by virtue of placing an electrode plate 9A on the rear side of the card and an oval electrode plate 9B on the front side of the card, the front electrode plate 9B having an opening 9C adapted to a thumb size. The manner in which the thumb is measured is not an important feature of the invention, since measuring methods other than the method shown may also be used, for instance with the aid of induction, humidity (dampness), etc., with equally good results. Furthermore, it is not necessary to measure only one digit of one hand, such as the thumb, but that a combination of hand digits, such as a finger combination, may be used and therewith provide still greater security. The important factor in this regard is that some characteristic feature of the owner is measured to enable the lawful owner of the card to be identified when the owner uses the card.

Figure 3:
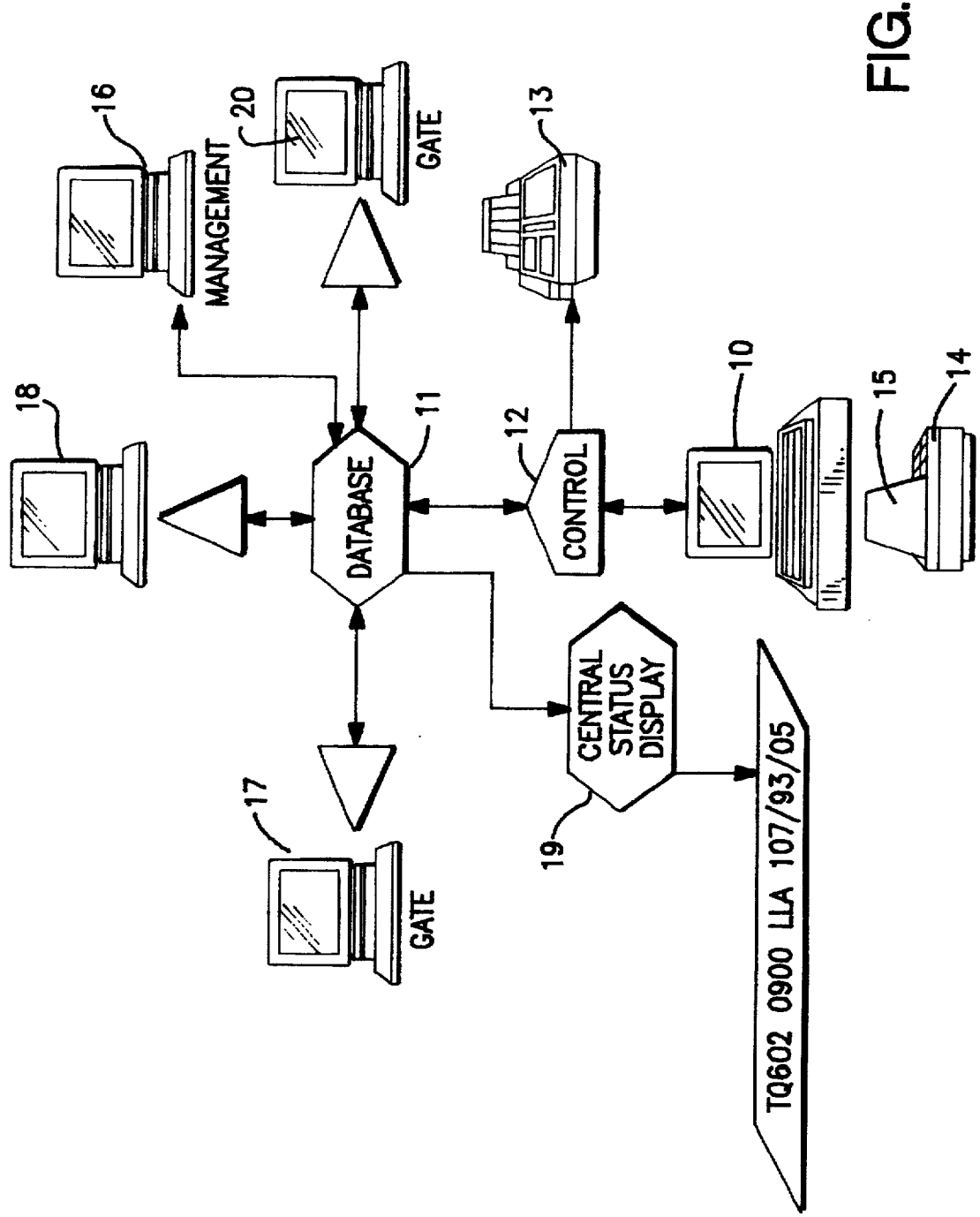
FIG. 3 illustrates an embodiment of the registration system in which the travel pass is used.

The travel pass forms part of a registration system, which is illustrated in FIG. 3. In order to obtain a travel pass of the aforedescribed kind, a potential traveller applies at a travel agent who is equipped with data terminal 10 connected to a data base 11. All registration data, such as name, address, the traveller's telephone number and time of departure and the route destiny are registered by the agent. The information or data is checked in a check unit 12 to ensure that the data is correct. A call can be made by telephone or from a fax-station 13 to a control register in order to check that the personal data given by the traveller is correct and also whether or not the journey or route has already been booked, wherein the agent books the journey or route if it is available. A travel pass unit 15 can then be programmed with the data given in a separate "writer" 14. As beforementioned, each travel pass unit 15 is given a unique identity number in its original manufacture, this number being written into the fixed memory. This memory is read-off. In addition, the potential owner of the travel pass unit places his/her thumb in the identification unit and the data thus measured can be written permanently into a fixed memory provided especially for this function. Data relating to the traveller, the journey or route to be made by the traveller, and the card identity number is then transferred to the data base 11.

One or more booking centers 16 may also be connected to the data base 11. The traveller is now provided with a travel pass unit 15. The traveller is able to book other future journeys over the telephone. Booking data is transferred from the data base to, for instance, the ticket control facility 17 and/or the check-in gate 18 at the airport from which the flight to the given destination departs. The ticket control facility 17 will include an apparatus 19 into which the travel pass unit 15 can be inserted, or a separate device 19 will be provided in the departure hall, wherein the unique identity number is read-off and the journey that has been booked by telephone and stored in the data base 11 is inserted into the unit. The unit 15 may, after all, have been earlier provided with the relevant information relating to journeys. Such irrelevant data is erased.

Naturally, the apparatus 19 may be constructed to read a booking that has been written into the travel pass unit 15 and other information in a way different to that described, and may also check the unit in another way. The reference numeral 20 identifies another check-in facility and travel pass checking apparatus, which may be installed on board ship, a train or a bus.

Prior to inserting the unit into the apparatus, the owner of the unit activates the unit by pressing one of the keys 3, 4, which activates the thumb measuring circuit a for one or a few minutes. The owner then identifies himself/herself as the genuine owner, by placing his/her thumb inside the ring 9B on the front side of the unit, so that the measuring circuit is able to measure the capacitance between the electrodes 9A and 9B, and the processor in the base or holder 1 is able to compare the measured capacitance with the value initially stored and accept the travel pass unit as valid with regard to the owner, when these values mutually agree within preset acceptable deviations.

A check is also made at the entrance of gate 18 to the aircraft to ascertain that the travel pass unit and its holder belong together, by checking the thumb or some other characteristic pertinent to the owner, with the aid of the measuring circuit 8.

The display window 2 displays data relating to a booked journey or route to the owner. For instance, when checking in it may happen that the check-in terminal or gate-terminal is out of function. The owner of the pass, however, is able to show that the pass is valid, because details of the journey are displayed in the display window. The display window 2 may include a small part 21 which shows up red for instance when the thumb check is not correct and which shows up green when the thumb check can be accepted, therewith also enabling a thumb check to be made in the event of a terminal malfunction.

It will be understood that the invention is not limited to what has been described and disclosed but that many modifications are possible within the scope of the following claims.

We claim:

1. Travel registration system including a travel pass unit for general communication by train, air, sea, or bus, wherein the unit includes a processor, a write and erasable memory unit connected to the processor, a display window (2), and keys which can be operated by a traveller in possession of the travel pass, the system comprising a travel pass unit issuing station (10) in which a traveler seeking a travel pass is registered together with a code number which is unique to the travel pass unit (15) and which is written into a fixed memory, and in which station data relating to the traveller is written into a writable memory unit in the travel pass and, on the occasion of issuing the pass, any data relating to the journey or route concerned;

a data base (11) to which data relating to an issued travel pass is intended to be stored together with information relating to the journey or route concerned; and a plurality of terminals (17–20) which are connected to the data base (11) and which are equipped with travel pass unit readers/writers, wherein subsequent to inserting the travel pass unit each terminal scans the data written into its memory, checks this data with data continued in the data base concerning the travel pass unit and checks that the data written into the travel pass unit and relating to the journey or route coincides with the journey or route written into the data base, and when no agreement is found writes into the memory of the travel pass unit the data stored in the data base concerning the journey or the route in question.

2. A system according to claim 1, wherein the keys on the travel pass unit solely instigate activation of unit elements and the display of information written into the memory unit.

3. A system according to claim 1, wherein the travel pass unit includes sensor elements (8, 9A, 9B) for identifying a unique characteristic of the owner of the unit, wherein a signal received in the processor from a sensor element is compared with memory stored data relating to an acceptable signal.

4. A system according to claim 3, wherein each terminal is arranged to check that identification of the card owner in relation to the card was positive prior to carrying out other checks on the travel pass unit in the data base, and when such is not the case to reject the card as not being identifiable with the correct owner.

5. A system according to claim 3, wherein the sensor element (8, 9A, 9B) is activated only after a given period of time has lapsed since the travel pass unit was activated.

6. A system according to claim 3, wherein the display window (2) includes a display part (21) which in response to an identification process with the aid of the sensor element is adapted to be shown over a predetermined time period upon completion of the identification operation.

* * * * *